United States Patent
Yun et al.

(10) Patent No.: US 7,693,115 B2
(45) Date of Patent: Apr. 6, 2010

(54) METHOD OF TRANSMITTING OR RECEIVING A DATA PACKET IN PACKET DATA COMMUNICATION SYSTEM USING A HYBRID AUTOMATIC REPEAT REQUEST

(75) Inventors: Young Woo Yun, Seoul (KR); Young Jo Lee, Kunpo-shi (KR); Ki Jun Kim, Seoul (KR); Soon Yil Kwon, Kunpo-shi (KR); Suk Hyon Yoon, Seoul (KR); Jong Hoe An, Anyang-shi (KR); Chan Ho Kyung, Kunpo-shi (KR)

(73) Assignee: LG Electronic, Inc., Seoul (KR)

( * ) Notice: Subject to any disclaimer, the term of this patent is extended or adjusted under 35 U.S.C. 154(b) by 148 days.

(21) Appl. No.: 11/927,408

(22) Filed: Oct. 29, 2007

(65) Prior Publication Data

US 2008/0049793 A1 Feb. 28, 2008

Related U.S. Application Data

(63) Continuation of application No. 10/103,753, filed on Mar. 25, 2002, now Pat. No. 7,346,037.

(30) Foreign Application Priority Data

Mar. 26, 2001 (KR) .................. 10-2001-0015738
Mar. 31, 2001 (KR) .................. 10-2001-0017139
Apr. 23, 2001 (KR) .................. 10-2001-0021830

(51) Int. Cl.
*H04B 7/216* (2006.01)
(52) U.S. Cl. .................. 370/335; 370/473; 370/501
(58) Field of Classification Search .................. None
See application file for complete search history.

(56) References Cited

U.S. PATENT DOCUMENTS

| 5,903,724 | A  | 5/1999  | Takamoto et al.    |
| 6,930,981 | B2 | 8/2005  | Gopalakrishnan et al. |
| 6,977,888 | B1 | 12/2005 | Frenger et al.     |
| 7,039,042 | B1 | 5/2006  | Fraas et al.       |
| 2002/0053049 | A1 | 5/2002 | Shiomoto et al.   |

(Continued)

FOREIGN PATENT DOCUMENTS

EP          0948154          10/1999

(Continued)

OTHER PUBLICATIONS

Lucent Technologies: "TSG-RAN#17(00)1382: Asynchronous and Adaptive IR for HSDPA".

*Primary Examiner*—Jayanti K Patel
*Assistant Examiner*—Jung Park
(74) *Attorney, Agent, or Firm*—Lee, Hong, Degerman, Kang & Waimey

(57) ABSTRACT

A method of transmitting/receiving a packet using a hybrid automatic repeat request in the mobile communication system is disclosed. The packet data transmitting method includes transmitting at least one sub packet divided from plurality of encoded packets generated by repeating a bit stream that is made by encoding information desired to be transmitted with 1/5 rate turbo encoder, and transmission start point information of the sub packet through the sub packet identifier field on the accompanying control channel.

5 Claims, 11 Drawing Sheets

U.S. PATENT DOCUMENTS

| | | | |
|---|---|---|---|
| 2002/0064167 A1* | 5/2002 | Khan et al. | 370/410 |
| 2002/0103953 A1* | 8/2002 | Das et al. | 710/105 |

FOREIGN PATENT DOCUMENTS

| | | |
|---|---|---|
| JP | 01-288117 | 11/1989 |
| JP | 02-002767 | 1/1990 |
| JP | 08-088620 | 4/1996 |
| JP | 09-186740 | 7/1997 |
| JP | 10-023015 | 1/1998 |
| JP | 10-257052 | 9/1998 |
| JP | 10-341196 | 12/1998 |
| JP | 11-074868 | 3/1999 |
| JP | 11-205216 | 7/1999 |
| JP | 2000-007118 | 1/2000 |
| JP | 2000-502852 | 3/2000 |
| JP | 2000-224226 | 8/2000 |
| JP | 2000-244461 | 9/2000 |
| KR | 10-1997-0031557 | 6/1997 |
| KR | 10-1999-0058410 | 7/1999 |
| KR | 10-2000-0013206 | 6/2000 |
| KR | 10-2001-0041310 | 5/2001 |
| KR | 10-2002-0045075 | 6/2002 |
| KR | 10-2002-0045079 | 6/2002 |
| WO | 00/05911 | 2/2000 |
| WO | 00/21236 | 4/2000 |
| WO | 00/25469 | 4/2000 |
| WO | WO 0036870 | 6/2000 |
| WO | 00/45543 | 8/2000 |
| WO | WO 0045543 | 8/2000 |
| WO | WO 0013376 | 4/2001 |

* cited by examiner packet packet

METHOD OF TRANSMITTING OR RECEIVING A DATA PACKET IN PACKET DATA COMMUNICATION SYSTEM USING A HYBRID AUTOMATIC REPEAT REQUEST

This application is continuation of U.S. application Ser. No. 10/103,753, filed Mar. 25, 2002, now U.S. Pat. No. 7,346, 037 issued on Mar. 18, 2008, which pursuant to 35 U.S.C. § 119(a) claims the benefit of the Korean Application Nos. P01-17138, P01-17139, and P01-21830 filed on Mar. 26, 2001, Mar. 31, 2001 and Apr. 23, 2001, which are hereby incorporated by reference in their entirety.

BACKGROUND OF THE INVENTION

1. Field of the Invention

The present invention relates to a mobile communication system, and more particularly, to a method of transmitting or receiving a data packet in packet data communication system using a hybrid automatic repeat request.

2. Discussion of the Related Art

Generally, a hybrid automatic repeat request (HARQ) is used for transmission of packet data in a mobile communication system.

That is, the object of the HARQ is to improve the reliability and throughput during data transmission in the communication system by combining an automatic repeat request (ARQ) with a forward error correction (FEC).

The object of the ARQ is to improve the reliability in a manner that a receiving end requests repeat of the same information until the initially sent information is received in the receiving end without error. The object of the FEC is for the receiving end to compensate for the error occurring due to the channel environment using an error correction code.

If the channel environment is good and the error occurring frequency of the given information is low, only the use of the ARQ will suffice for the reliability.

However, if the channel environment gets worse, the error occurring frequency of the given information becomes greater, and thus the frequency of repeat request also becomes greater.

This deteriorates the throughput of the system. Thus, it has been proposed to use both the ARQ and the FEC, which is called the HARQ.

As a kind of the HARQ, there is a method that uses an incremental redundancy.

According to this method, a transmitting end first transmits information encoded with a high coding rate to a receiving end, encodes the information with the coding rate lowered whenever the repeat request is received from the receiving end, and then transmits only the additional redundancy bits to the receiving end. The receiving end combines the received redundancy bits with the previously sent information to decode the information.

These additional redundancy bits are bits added for error correction or detection of the previously transmitted data packet.

To do so, the receiving end can obtain the gain according to the combining. Also, since the combining coding rate of the packet data is gradually reduced whenever the repeat is performed, the transmitting end can adaptively give the redundancy to the data packet according to the change of the channel environment.

Currently, in a high data rate (HDR) mobile communication system, the incremental redundancy of the HARQ, particularly a synchronous incremental redundancy (SIR) is used.

According to the SIR method, as shown in FIG. 1A, information to be transmitted is encoded and repeated to construct one packet, and then the data packet is divided into sub packets of a fixed size for transmission.

Specifically, the transmitting end transmits a sub packet among sub packets that constitute a data packet. If the receiving end performs decoding of the transmitted sub packet without error and transmits an acknowledgment (ACK) to the transmitting end, the transmitting end transmits no further sub packet.

If the receiving end fails to perform the decoding of the transmitted sub packet and transmits a non-acknowledgment (NACK) to the transmitting end, the transmitting end transmits the next sub packet.

Meanwhile, in order to heighten the transmission rate in the changing channel environment, it is advantageous to change the length of the respective sub packets according to the changing channel environment.

Accordingly, in order to implement this, a method that uses a variable sub packet length has been proposed as shown in FIG. 2A.

During the process of dividing a data packet into several sub packets and transmitting the sub packets, this method enables the transmission of the respective sub packets to be performed with different sub packet lengths according to the channel environment.

At this time, there is provided a control channel for notifying information on the length of the sub packet, sub packet identifier (ID), etc.

If the transmitting end transmits the packet data to the receiving end through the above-described process, the receiving end extracts information on the sub packet through the control channel to receive the sub packet.

Then, the receiving end performs the decoding of the data packet by concatenating/combining the received sub packet with the data packet previously sent from the transmitting end using the extracted information.

In case of using the sub packets of the fixed length as shown in FIG. 1A, the length of all the sub packets is fixed, and thus the receiving end can grasp the transmission start point of the currently received sub packet if it knows the order of the sub packets even when it cannot receive any sub packet. Thus, it can perform the decoding by regenerating the packet with other sub packets (or even with only one sub packet) as shown in FIG. 1B.

Thus, if there is information on the order of the sub packet currently transmitted, the receiving end can recognize the transmission start point of the sub packet. In case of using the SIR method in the HDR system, the receiving end can always recognize information on when its own sub packet is received after the first sub packet is received, and thus does not require other control information in the event that the received sub packet is not the fifth sub packet. However, in case of using an asynchronous incremental redundancy, the transmission time of the next sub packet may randomly change even if the transmission time of the first sub packet is determined, and thus all the sub packets should be transmitted to the receiving end along with the information on the sub packet ID and the sub packet length that is the control information on the sub packet. In case that the length of the respective sub packet is fixed, the receiving end can recognize the transmission start point of the respective sub packet even if the transmitting end just transmits the sub packet IDs in order.

However, according to the method that uses the sub packets of the variable length as shown in FIG. 2A, the length of the sub packet is changed whenever the sub packet is transmitted, and thus if the control channel that includes the sub packet information is not received, the start point of the data packet cannot be recognized only through the respective sub packet ID.

That is, it cannot be recognized where the currently received sub packet starts. For this reason the variable length type method cannot decode the data packet even if only one sub packet is missing.

Specifically, if a sub packet 2 is not received and a sub packet 3 is received, there is no information on the previous sub packet 2 during the process of concatenating the sub packet 1 and the sub packet 3, and thus it cannot be recognized of which type between two types as shown in FIGS. 2B and 2C the sub packet 3 is received.

In the sequential transmitting method wherein the transmission of the next sub packet starts at a position where the transmission of the previous sub packet ends, if the receiving end misses even one sub packet, it cannot recognize the transmission position of the incoming sub packet after the missing sub packet, and thus the decoding cannot be performed.

To solve the above-described problem, a method is used as follows. That is, in transmitting variable sub packets, each sub packet is transmitted from the fixed start position in the encoded packet to the receiving end, and the information on the length and the starting position of the sub packet is transmitted to the receiving end through the control channel. The receiving end extracts the information on the sub packet through the control channel, and performs the decoding by concatenating/combining the received sub packet with the previously received sub packet using the extracted information.

However, in case of using this method, a certain portion in the encoded packet may be repeatedly transmitted, while another portion may not be transmitted, resulting in that the coding gain according to the HARQ cannot be obtained sufficiently.

SUMMARY OF THE INVENTION

Accordingly, the present invention is directed to a method of transmitting a sub packet of a variable length using a hybrid automatic repeat request in the mobile communication system that substantially obviates one or more problems due to limitations and disadvantages of the related art.

An object of the present invention is to provide a method of transmitting a sub packet of a variable length using a hybrid automatic repeat request that enables a receiving end to perform decoding of the data packet by regenerating transmitted sub packets even if any sub packet is missing during transmitting/receiving of the sub packets.

Another object of the present invention is to provide a method of transmitting a sub packet of a variable length using a hybrid automatic repeat request (HARQ) that can increase the coding gain according to the HARQ.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a data packet in packet data communication system using hybrid automatic repeat request includes transmitting at least one sub packet divided from plurality of data packets generated by repeating a bit stream that is made by encoding information desired to be transmitted with 1/5 rate turbo encoder, and transmission start point information of the sub packet through the sub packet identifier field on the corresponding control channel.

In another aspect of the present invention, a method of transmitting a data packet in packet data communication system using hybrid automatic repeat request includes generating plurality of data packets by repeating a bit stream that is made by encoding information desired to be transmitted with 1/5 rate turbo encoder, and dividing the plurality of data packets into at least one sub packet. Here, the sub packets are divided according to transmission start points determined according to a rule made between a transmitting end and a receiving end. The transmitting end informs the transmission start point through a control channel using a sub packet identifier, and transmits the corresponding sub packet to the receiving end through a data transmission channel, starting from the transmission start point.

Preferably, the transmission start point of the respective sub packet is determined according to the number of code symbols of the corresponding sub packet and a corresponding sub packet identifier. Here, the possible starting points for present sub packet transmission in the data packet are calculated as taking modulo 5N operation on the products between the number of code symbols of the corresponding sub packet and the corresponding sub packet identified, where N represents the length of information bits of the data packet. Here, the number of code symbols is determined according to the number of slots through which the sub packet is transmitted, data rate, modulation type, and the number of Walsh codes available for the sub packet transmission.

Preferably, the selection of the sub packet identifier to be presently transmitted is performed in a manner that the sub packet identifier having a maximum coding gain among the remaining sub packet identifiers except for the sub packet identifier for representing an initial transmission position is selected.

Preferably, the method further includes the steps of mapping the transmission start points at equal intervals in the data packet, and transmitting a certain sub packet, starting from one of the mapped transmission start points.

Preferably, the method further includes the steps of mapping the transmission start points at unequal intervals in the data packet, mapping more transmission start points on a position of the data packet where the bit stream having high importance is located, and mapping less transmission start points on a position where the bit stream having low importance is located, and transmitting a certain sub packet, starting from one of the mapped transmission start points.

Preferably, the method further includes additionally transmitting through the control channel information on whether the sub packet corresponding to the transmission start point information is the sub packet of a new packet or the successive sub packet of the previous packet.

Preferably, among combinations composed of predetermined numbers of bits, two combinations represent the initial transmission start point information of the sub packet, and the remaining combinations represent other transmission start point information. Here, one of the two combinations that represent the initial transmission start point information represents the initially transmitted sub packet in the packet, and the other represents the successive sub packet of the previously transmitted sub packet.

In still another aspect of the present invention, a method of receiving a data packet in packet data communication system using hybrid automatic repeat request includes receiving through a data transmission channel at least one sub packet divided from plurality of data packets generated by repeating a bit stream that is made by encoding information desired to be received with 1/5 rate turbo encoder, receiving through a control channel transmission start point information of the received sub packet in the data packet, and regenerating the data packet according to the corresponding transmission start point information of the sub packet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Now, the features and effects of the data packet transmitting/receiving method according to the embodiments of the present invention will be explained with reference to the accompanying drawings.

First Embodiment

The first embodiment of the present invention provides a method capable of decoding received sub packets even if a receiving end fails to receive any one of the sub packets by fixing transmitted positions of the respective sub packets in a packet when transmitting the sub packets having a variable length.

Figure 1A:
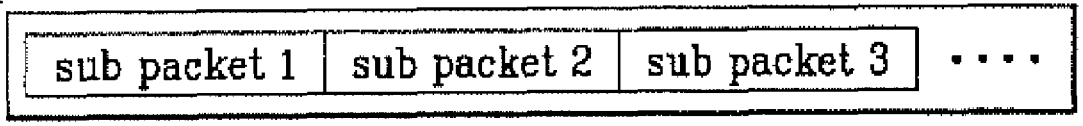
FIG. 1A is a view illustrating the construction of a data packet having sub packets of a fixed length according to a conventional hybrid automatic repeat request method.
Figure 1B:
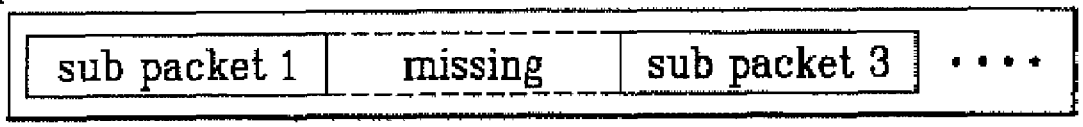
FIG. 1B is a view illustrating the construction of the data packet of FIG. 1A wherein a certain sub packet of the fixed length is missing.
Figure 2A:
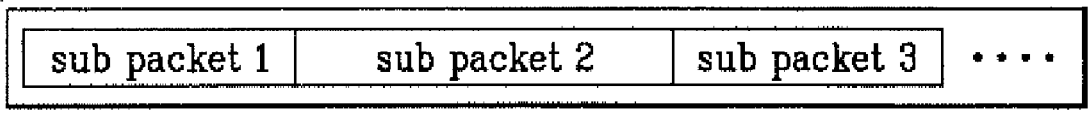
FIG. 2A is a view illustrating the construction of a data packet having sub packets of a variable length according to a conventional hybrid automatic repeat request method.
Figure 2B:
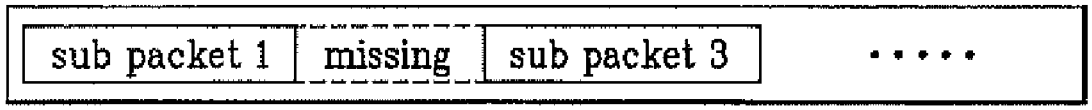
FIGS. 2B and 2C are views illustrating the construction of the packet of FIG. 2A wherein a certain sub packet of the variable length is missing.
Figure 2C:
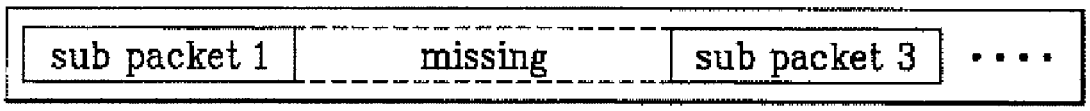
Figure 3A:
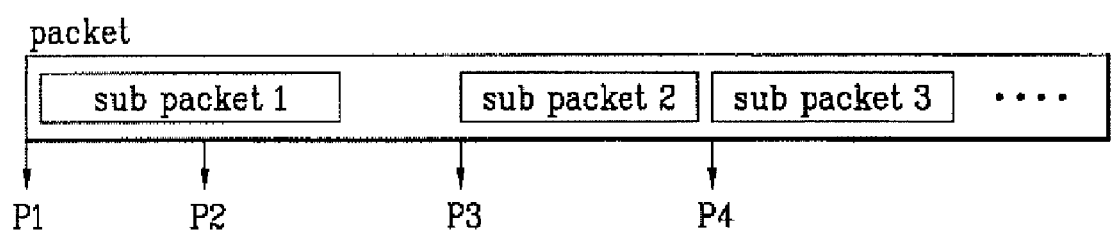
FIGS. 3A and 3B are views explaining examples of a sub packet transmitting method according to the present invention.
Figure 3B:
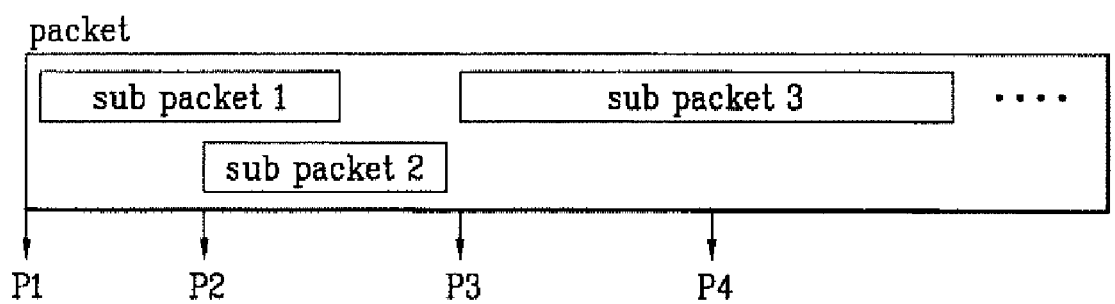

FIGS. 3A and 3B are views explaining examples of a sub packet transmitting method according to the present invention.

In FIGS. 3A and 3B, starting points are positioned at equal intervals.

In FIG. 3B, the same information in the data packet may overlap each other over two sub packets.

Referring to FIGS. 3A and 3B, when transmitting the sub packets, the transmitting end transmits the respective sub packet, starting from a proper position selected among the previously determined sub packet transmission start points.

First, the transmitting end determines several transmission start points positioned at equal intervals to transmit the sub packets.

Thus, the sub packet ID information that the transmitting end transmits through the control channel does not mean information on the order of the sub packets presently transmitted by the transmitting end, but means the start point information for informing from which transmission start point among the several start points promised between the transmitting end and the receiving end the transmission of the present sub packet starts.

That is, the transmitting end informs that the transmitted sub packet is a sub packet that starts at a certain time point among the promised transmission time points P1, P2, P3, and P4.

As described above, the transmitting end transmits the start point information to the receiving end, and thus the receiving end can recognize at which position the respective sub packet is located in the data packet even if the previous sub packet is missing.

Accordingly, even in case that any sub packet is missing, the receiving end can receive other sub packets except for the missing sub packet, regenerate the data packet by concatenating or combining the received sub packets, and decode the regenerated packet.

Two methods of mapping the transmission start points of the sub packets in the encoded packet may be considered.

One is a method having start points at equal intervals. In case that all the information in the data packet have the same importance, the transmission start points of all the sub packets are mapped at equal intervals in the data packet irrespective of the importance of the information.

The other is a method having start points at unequal intervals. If the start points are mapped at equal intervals in case that the information in the encoded packet have different importance according to their positions, the information having a high importance may not be transmitted to cause a loss.

Accordingly, in order to heighten the probability that the information at the position of a high importance, the transmission start points are mapped at unequal intervals by mapping more transmission start points on positions of a high importance in the data packet.

Figure 4A:
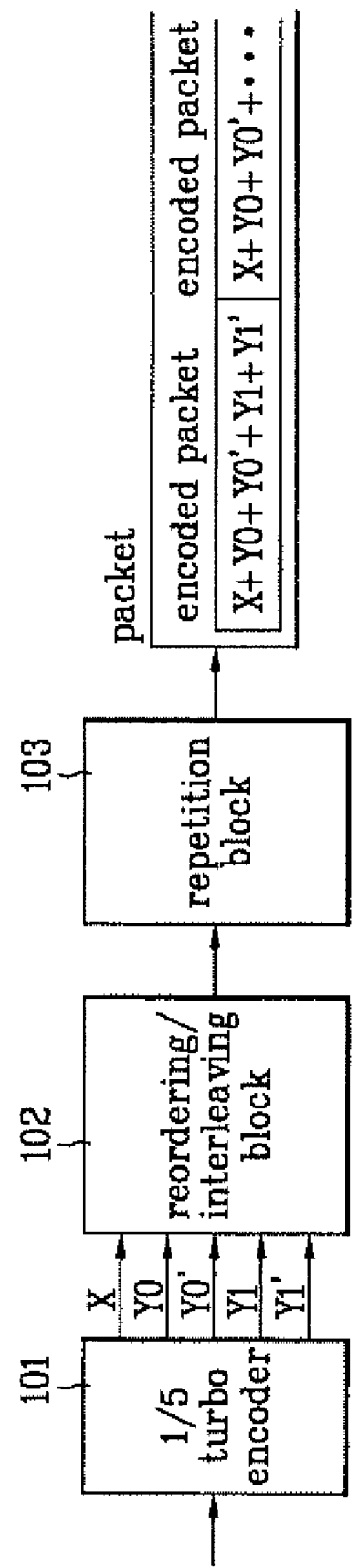
FIG. 4A illustrates a packet having sub data and blocks for generating the data packet in case that information in the data packet does not have a positional reliability according to the present invention.
Figure 4B:
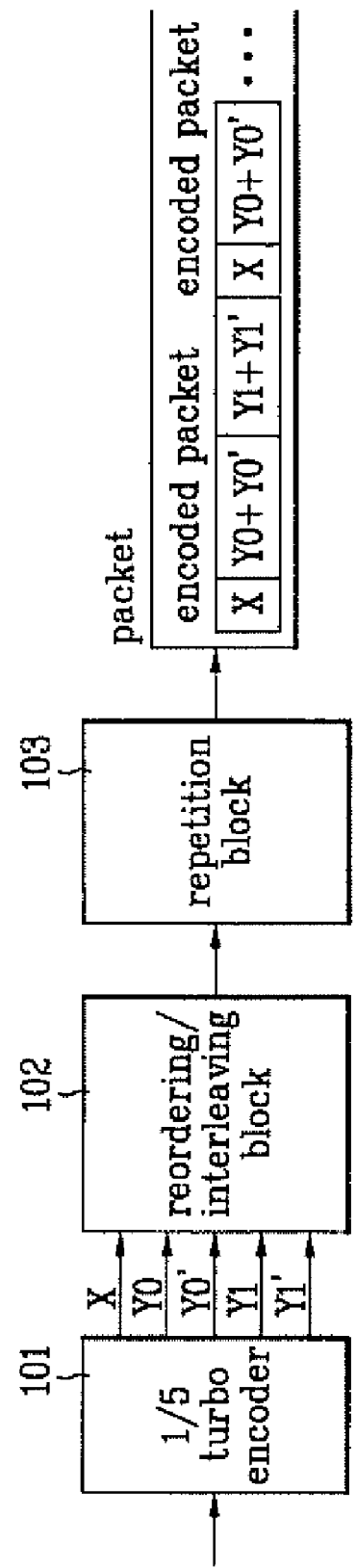
FIG. 4B illustrates a data packet having sub packets and blocks for generating the data packet in case that information in the data packet has a positional reliability according to the present invention.

The data packet constructions according to the present invention wherein the transmission start points are mapped in two cases are shown in FIGS. 4A and 4B.

FIG. 4A illustrates a data packet having sub packets and blocks for generating the data packet in case that the information in the packet does not have a positional reliability according to the present invention.

FIG. 4B illustrates a packet having sub packets and blocks for generating the data packet in case that the information in the data packet has a positional reliability according to the present invention.

Referring to FIGS. 4A and 4B, in a system provided with a mother coder having a code rate of 1/5, a turbo encoder 101 provides 5 kinds of outputs X, Y0, Y0', Y1, and Y1'.

Here, X denotes information bits, and Y0, Y0', Y1, and Y1' denote redundancy signs added to the information bits.

A reordering/interleaving block 102 receives the bit stream outputted as above, and generates encoded packets. A repetition block 103 receives the encoded packets, and generates the data packet.

At this time, it is assumed that the encoded packets are infinitely repeated, and the transmitting end successively transmits the sub packets until the receiving end decodes the encoded packets without error. Also, it is assumed that the data packet is divided into a plurality of sub packets having a variable length.

As shown in FIG. 4A, if X, Y0, Y0', Y1, and Y1' are uniformly distributed in the whole encoded packet during the interleaving, no positional importance of the encoded packet exists.

Accordingly, in case that the transmission start points are mapped by dividing the encoded packet into four parts, and the sub packets corresponding to the respective transmission start points are to be transmitted, the transmission start points of the sub packet in the encoded packet are mapped on the positions where the encoded packet is divided into four parts.

Figure 5A:
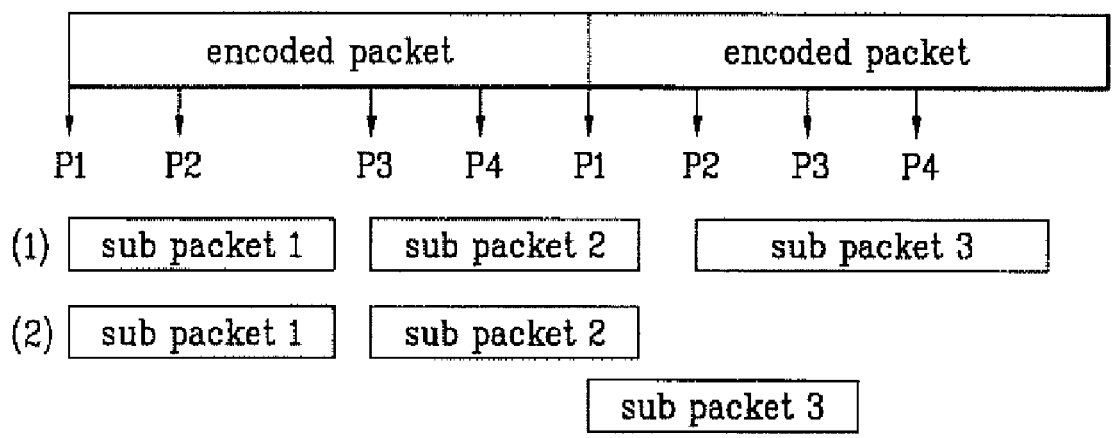
FIG. 5A is a view illustrating transmission intervals of respective sub packets in case that start points in a encoded data packet are divided at equal intervals according to the present invention.

FIG. 5A is a view illustrating transmission intervals of respective sub packets in case that start points in an encoded packet are divided at equal intervals according to the present invention.

As shown as (2) in FIG. 5A, the information of the respective sub packets may overlap each other.

At this time, as can be known through the overlapping and transmitted sub packets, if it is assumed that the sub packet IDs corresponding to the transmitted sub packets, for example, the bit combinations for representing P1, P2, P3, and P4 are 00, 01, 10, and 11, the transmission of the remaining bit combinations except for the bit combination for representing the initial transmission start point, i.e., 00, may not be performed in order, but may be performed in the order for heightening the coding gain (i.e., for reducing the occurrence of overlapping) or with overlapping one another. Thus, as shown as (2) in FIG. 5A, it can be confirmed that P1, P3, P1, etc., are successively transmitted.

Meanwhile, as shown in FIG. 4B, if it is assumed that the importance of the outputs X, Y0, and Y0' of the turbo encoder 101 are higher than that of Y1 and Y1', X and (Y0+Y0') are arranged in the front portion of the encoded packet generated by interleaving X, (Y0+Y0'), and (Y1+Y1''), respectively, and thus the front portion has a higher importance.

In this case, the transmitting end maps more transmission start points on the front portion of the encoded packet when dividing the encoded packet constructed by repeating the encoded packets into four parts.

At this time, even if the receiving end cannot receive a certain sub packet transmitted form the encoded packet, the probability that X, Y0, and Y0' having a high importance are received can be higher, and the loss of the coding gain that may occur at equal intervals can be reduced.

Figure 5B:
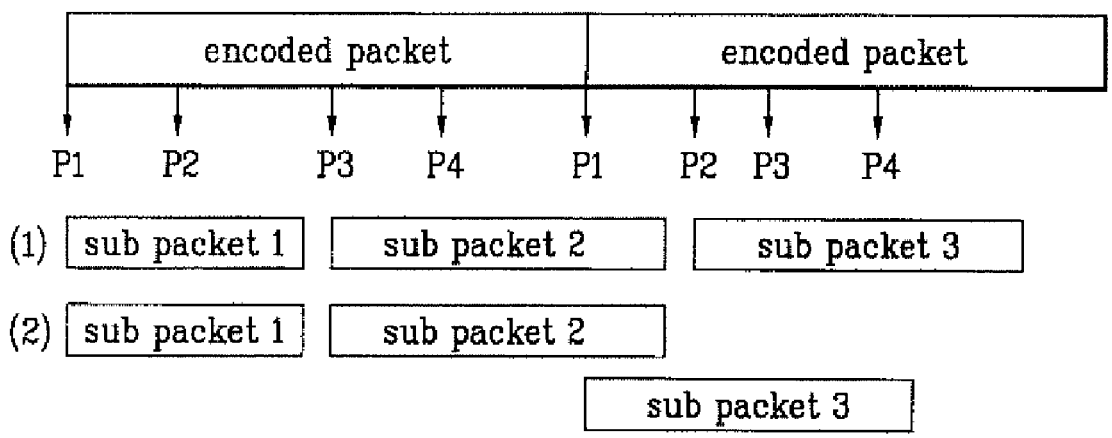
FIG. 5B is a view illustrating transmission intervals of respective sub packets in case that start points in a encoded data packet are divided at unequal intervals according to the present invention.

FIG. 5B is a view illustrating transmission intervals of respective sub packets in case that start points in a encoded packet are divided at unequal intervals according to the present invention.

As shown as (2) in FIG. 5A, the transmission start points are divided at unequal intervals in the encoded packets, and the information of the respective sub packets may overlap each other according to the importance of the information to be transmitted from the transmitting end.

In the same manner, as can be known through the overlapping and transmitted sub packets, if it is assumed that the sub packet IDs corresponding to the transmitted sub packets, for example, the bit combinations for representing P1, P2, P3, and P4 are 00, 01, 10, and 11, the transmission of the remaining bit combinations except for the bit combination for representing the initial transmission start point, i.e., 00, may not be performed in order, but may be performed in the order for heightening the coding gain (i.e., for reducing the occurrence of overlapping) or with overlapping one another.

Figure 6:
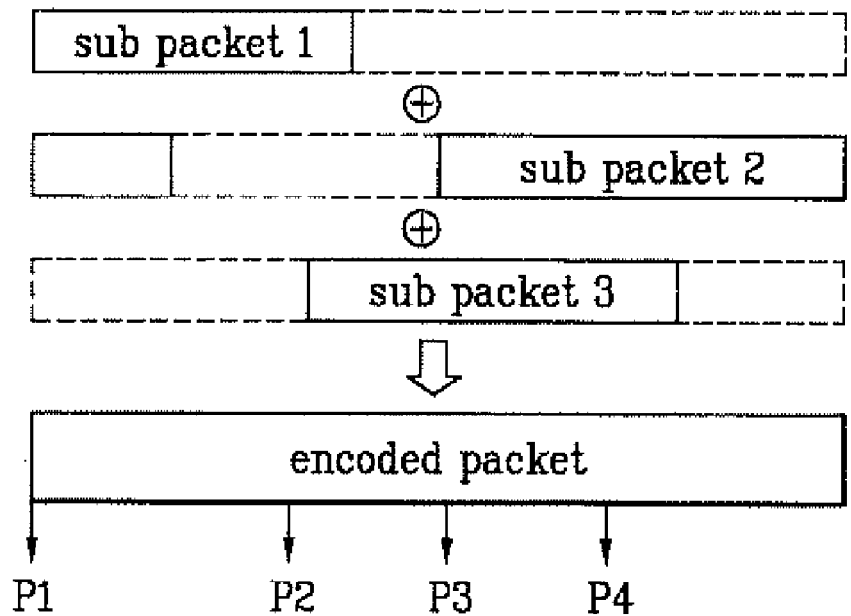
FIG. 6 is a view illustrating an encoded packet generated by regenerating the transmitted sub packets in a receiving end according to the present invention.

FIG. 6 is a view illustrating an encoded packet generated by regenerating the transmitted sub packets in a receiving end according to the present invention.

Referring to FIG. 6, if the transmitting end transmits the respective sub packets to the receiving end according to the above-described two methods, the receiving end considers the sub packet ID transmitted from the transmitting end as a transmission start point indicator bit for informing which position among P1, P2, P3, and P4 the presently sent sub packet starts to be transmitted from.

When the sub packet is received, the receiving end judges which position the received sub packet is transmitted from through the sub packet identifier field on the control channel.

Then, the receiving end, using this positional information, generates an encoded packet by concatenating or combining the sequentially transmitted sub packets, and then decodes desired data from the encoded packet.

Meanwhile, in transmitting the encoded packet composed of the sub packets of a variable length, the present invention proposes two methods that can discriminate whether the sub packet received in the receiving end is the sub packet that is transmitted from the initial transmission start point of the sub packet generated from certain information.

First, one method is that the transmitting end includes in the control channel control information of one bit for informing the receiving end whether the transmitted sub packet is the sub packet of a new packet transmitted at the initial transmission start point of a certain packet.

Specifically, the transmitting end add a field that is called NC_IND(NEW/CONTINUE Indication) to a control channel. At this time, the transmitting end sets NC_IND to 0 for the sub packet transmitted from the initial transmission start point of the packet, and NC_IND to 1 for the sub packet not transmitted from the initial transmission start point. The transmitting end toggles NC_IND to 1 if the presently transmitted sub packet is the sub packet of a new packet in a state that NC_IND is successively set to 0. In the same manner, the transmitting end toggles NC_IND to 0 if the presently transmitted sub packet is the sub packet of a new packet in a state that NC_IND is successively set to 1.

The receiving end judges that the transmitted sub packet is the sub packet transmitted from the initial transmission start point of the encoded packet if NC_IND is 0, while it judges that the transmitted sub packet is not the sub packet transmitted from the initial transmission start point if NC_IND is 1.

Also, if NC_IND having the state of 1 is received while NC_IND having the state of 0 is successively received, the receiving end judges that the presently received sub packet is the sub packet of a new packet. In this case, the receiving end performs a new independent decoding process with respect to the presently received sub packet, but does not perform the concatenating/combining process with the previous sub packet. In the same manner, if NC_IND having the state of 0 is received while NC_IND having the state of 1 is successively received, the receiving end judges that the presently received sub packet is the sub packet of a new packet. In this case, the receiving end performs a new independent decoding process with respect to the presently received sub packet, but does not perform the concatenating/combining process with the previous sub packet.

Second, the other method is that the transmitting end modifies the control information on the transmission start point information of the transmitted sub packet.

Here, a portion of the control information is used for representing the sub packet that is transmitted from the initial transmission start point. The remaining portion of the control information is used for transmission of other transmission start point information that is not the initial transmission start point. At this time, the transmission position of the sub packet is represented using three bits, which is illustrated in FIG. 7.

Figure 7:
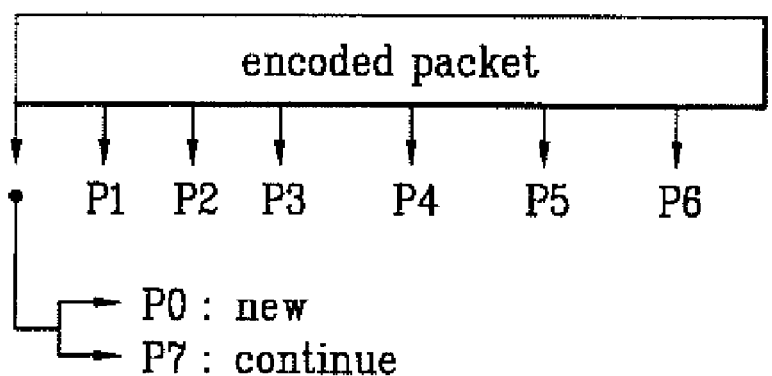
FIG. 7 is a view illustrating transmission intervals of respective sub packets of a variable length according to a hybrid automatic repeat request method according to the present invention.

FIG. 7 is a view illustrating transmission intervals of respective sub packets of a variable length according to a hybrid automatic repeat request method according to the present invention.

The transmitting end informs the receiving end the transmission position of the transmitted sub packet in the encoded packet and whether the transmitted sub packet is the sub packet that is transmitted from the initial transmission start point of the packet using three bits. Accordingly, P0(000) and P7(111) represent the initial transmission start point, and P1(001), P2(010), P3(011), P4(100), P5(101), and P6(110) represent positions of the remaining transmission start points. However, P0 is used as the control information of the sub packet transmitted from the initial transmission start point of the packet, and P7 is used as the control information of the successive sub packet of the previously transmitted sub packet even though it is the sub packet transmitted from the initial transmission start point of the packet.

Accordingly, the receiving end receives the 3-bit transmission position information of the sub packet from the transmitting end, and if the position information is P0(000), the receiving end judges the transmitted sub packet to be the initially transmitted sub packet, while if the position information is not P0(000), it judges the transmitted sub packet to be not the initially transmitted sub packet.

Though the above-described methods use the same control information, the first method provides four transmission positions of the sub packet, and the second method provides seven transmission positions.

Second Embodiment

In the same manner, the second embodiment of the present invention provides a method capable of decoding received sub packets even if a receiving end fails to receive any one of the sub packets by fixing start positions of the respective sub packets in a packet according to a specified mapping method promised between a terminal and a base transceiver system when transmitting the sub packets having a variable length.

In the second embodiment of the present invention, however, a method of determining the transmission position of the sub packet using the number of coded symbols transmitted on the current sub packet is proposed.

Here, the encoder packet is generated according to the construction of FIGS. 4A and 4B.

The transmission position of the sub packet generated as above is determined as follows.

If the size of the information bits on the encoded packet (i.e., the input packet of the turbo encoder 101 in FIGS. 4A and 4B) and the length of the sub packet are determined, the size of the code symbol of the sub packet is also determined. Using this information, the transmission position of the presently transmitted sub packet is determined under the assumption that the previous sub packet has the same code symbol size as the present sub packet.

The first sub packet whose sub packet identification (SPID) is 00 is always transmitted from the initial position of the encoded packet (i.e., the output packet of the repetition block 103 in FIGS. 4A and 4B) to the receiving end. The code symbol size of the second sub packet is obtained using the encoder packet size corresponding to the second sub packet and the length information of the sub packet, and the second sub packet whose sub packet identification (SPID) is 01 is transmitted from the next position of the encoded packet under the assumption that the first sub packet is transmitted with the code symbol size corresponding to the second sub packet. The code symbol size of the third sub packet is obtained using the encoder packet size corresponding to the third sub packet and the length information of the sub packet, and the third sub packet whose sub packet identification (SPID) is 10 is transmitted from the next position of the encoded packet under the assumption that the first and second sub packets are transmitted with the code symbol size corresponding to the third sub packet. The code symbol size of the fourth sub packet is obtained using the encoded packet size corresponding to the fourth sub packet and the length information of the sub packet, and the third sub packet whose sub packet identification (SPID) is 11 is transmitted from the next position of the encoded packet under the assumption that the first, second, and third sub packets are transmitted with the code symbol size corresponding to the fourth sub packet. At this time, it is assumed that the SPIDs of 00, 01, 10, and 11 are values transmitted in order. If the transmission start positions of the sub packets are determined as described above, the following effects can be obtained. The case that the channel status is kept fixed at a time point when the respective sub packet is scheduled for transmission. If so, the length of the code symbol of the transmitted sub packet will become uniform. As a result, the transmission start position of the determined sub packet will be the same as that of the sequential transmitting method that can obtain the maximum coding gain under the assumption that the channel status is fixed.

Also, in case that the size of the code symbol to be transmitted through the respective sub packet is changed due to the change of the channel status during transmission of the respective sub packet, the sub packet ID, i.e., the transmission start information of the sub packet, is determined so that the combining coding gain in the receiving end can be made maximum using the above-described process. In this method, the sub packet ID is not transmitted in order, but is assumed to be a value randomly transmitted. Also, the transmitting end properly selects the sub packet ID at this time, so that the overlapping rate between the sub packets is lowered and thus the coding gain in the receiving end is heightened. Also, the sub packet IDs may overlap each other to heighten the coding gain. This can be represented using an equation as follows.

First, it is defined that k is an index of a certain sub packet, $N_{EP}$ is the number of bits of an encoded packet, $N_{walsh,k}$ is the number of 32-chip Walsh channels of the k-th sub packet, $N_{slots,k}$ is the number of 1.25 ms slots of the k-th sub packet, the ID of the k-th sub packet is $SPID_k$, and $m_k$ is a variable that varies according to the modulation technique of the sub packet. At this time, $m_k$ is a value that is changed to 2, 3, and 4 in order according to the methods of QPSK, 8-PSK, and QAM, and may be changed according to the additional modulation type. $N_{EP}$, $N_{walsh,k}$, and $N_{slots,k}$ are values determined by the transmitting end (for example, base transceiver system), and are transmitted to the receiving end (for example, terminal) through the packet data control channel.

Also, if it is assumed that bit sequences of the repetition block 103 in FIGS. 4A and 4B are numbered from 0, the number $L_k$ of code symbols selected among the bit sequences for a certain k-th sub packet is determined by the following equation 1.

$$L_k = 48 * N_{walsh,k} * N_{slots,k} * m_k \quad \text{[Equation 1]}$$

Also, the starting of $F_k$ of a certain sub packet in the encoded packet corresponding to the determined number is determined by the following equation 2. Here it is assumed that the coding rate of turbo encoder is 1/5.

$$F_k = (SPID_k * L_k) \bmod (5 N_{EP}) \quad \text{[Equation 2]}$$

As is known from the equation 2, the position of the start point for transmitting the present sub packet is selected among several start positions made under the assumption that the length of the code symbol of the previously transmitted sub packet is equal to the length $L_k$ of the code symbol transmitted from the present sub packet. At this time, the position of the start point to be actually transmitted can be selected in the transmitting end, and a method used for this selection is to select the position so that the coding gain that can be obtained through the sub packet combination in the receiving end is made maximum. The position of the start information selected as above is transmitted to the receiving end by the sub packet ID.

Table 1 as below represents a modulation type according to the length of the sub packet (i.e., the number of slots per sub packet) and the size of the code symbol in case that the length of the encoder packet (i.e., data rate) is of 3072 bits, and the number of useable Walsh codes is 28.

TABLE 1

| Slots per Sub Packet | Data Rate (kbps) | Modulation | Code Symbols |
|---|---|---|---|
| 8 | 307.2 | QPSK | 21504 |
| 4 | 614.4 | QPSK | 10752 |
| 2 | 1228.8 | QPSK | 5376 |
| 1 | 2457.6 | 16-QAM | 5376 |

For Example, in case that the length of the sub packet is 2, the number of Walsh codes is 28, and 1.2288 Mcps chip is used, 48 modulation symbols can be included in a slot, and thus 1344 (i.e., 48*28) chips are generated in a slot. Accordingly, two slots include 2688 chips, and the size of the code symbols included in the chips is 5376 (i.e., 2*2688 performed by the QPSK method).

Figure 8A:
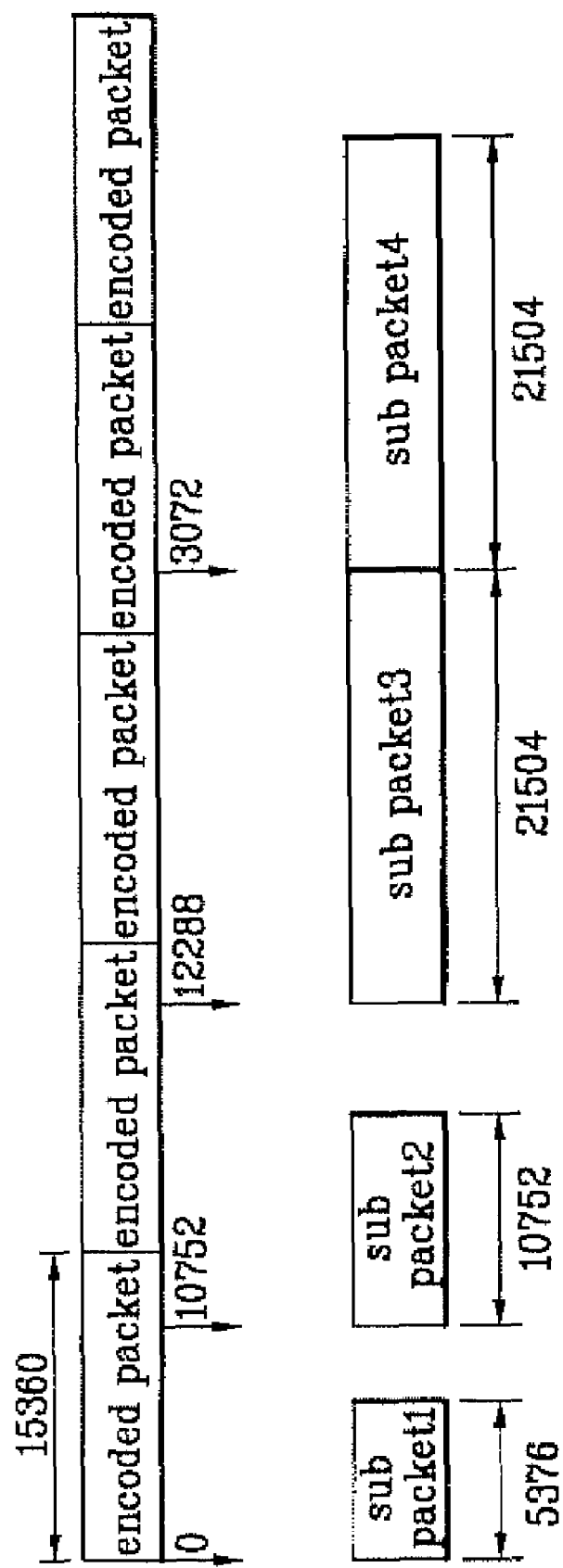
FIGS. 8A and 8B are views illustrating an example of an AIR type transmitting and restoring method according to the present invention.
Figure 8B:
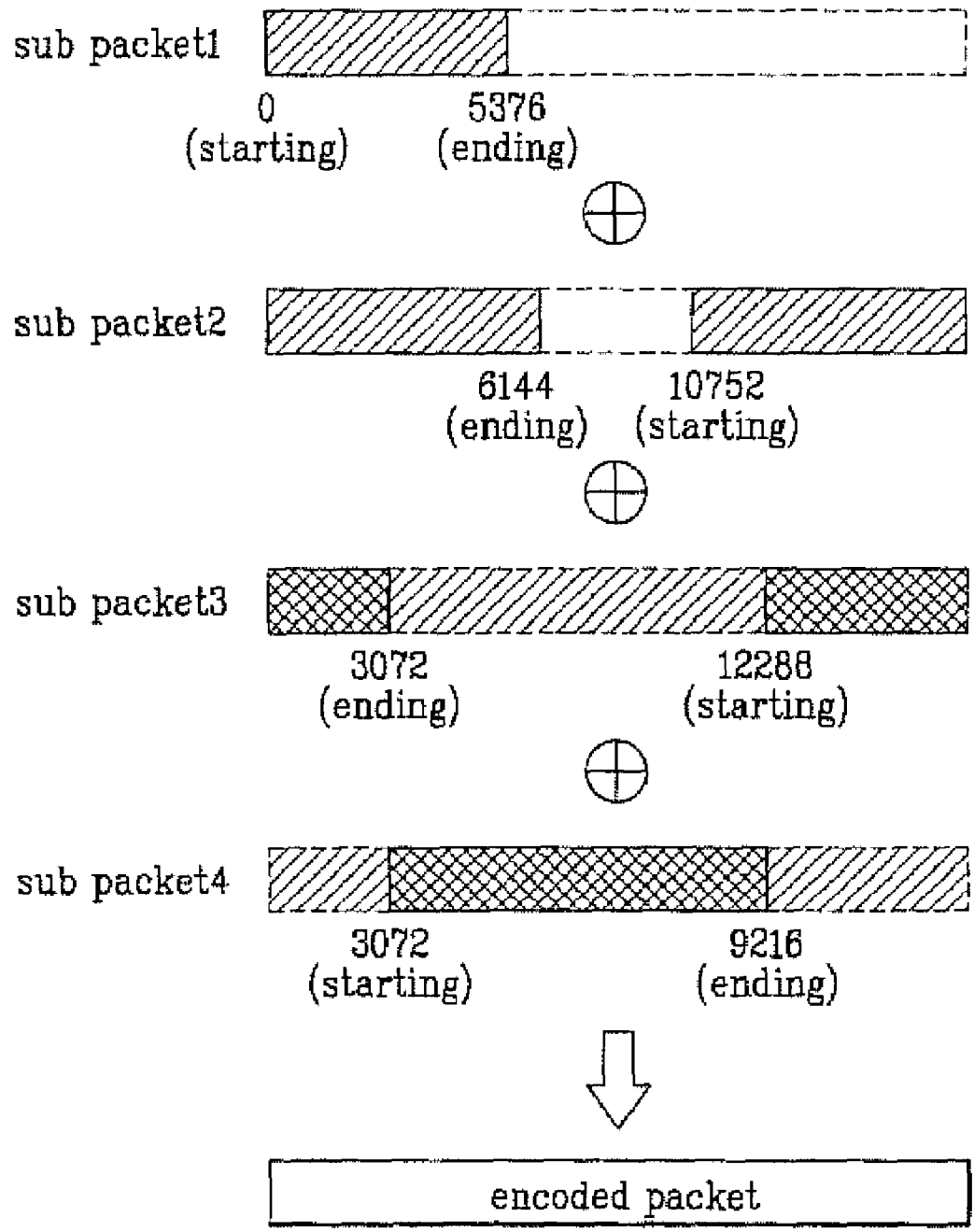

FIGS. 8A and 8B are views illustrating an example of an AIR type transmitting and restoring method according to the present invention.

In FIG. 8A, the length of the information bits on the encoder packet (i.e., the input packet of the turbo encoder 101 in FIGS. 4A and 4B) is 3072 bits, and the number of useable Walsh codes is 28. The length of the first sub packet (i.e., the number of slots per sub packet) is 2, the length of the second sub packet is 4, the length of the third sub packet is 8, and the length of the fourth sub packet is 8.

Accordingly, a plurality of encoded packets, which include 15360 bits (3072*5), are generated as shown in FIGS. 4A and 4B, and the transmission time points of the respective sub packets in the encoded packets are determined as follows.

That is, the first sub packet "00" is transmitted from the first of the encoded packet.

The receiving end successfully performs the decoding of one sub packet, and transmits an acknowledgment (ACK) to the transmitting end. Then, the transmitting end does not transmit any more sub packets.

However, if the receiving end fails to decode, it transmits a non-acknowledgment (NACK) to the transmitting end. Then, the transmitting end transmits the sub packet having the next SPID.

Accordingly, the code symbol size of the second sub packet is 10752 at a time point when the second sub packet "01" is transmitted, and if it is assumed that the previously transmitted sub packet has the code symbol size obtained in the present sub packet, the second sub packet is transmitted from the 10752nd position among the code symbols of the encoded packet.

In the same manner, the code symbol size of the third sub packet is 21504 at a time point when the third sub packet "10" is transmitted, and if it is assumed that the previously transmitted sub packet has the code symbol size obtained in the present sub packet, the third sub packet is transmitted from the 12288th (i.e., 21504*2−15360*2) position among the code symbols of the encoded packet.

The code symbol size of the fourth sub packet is 21504 at a time point when the fourth sub packet "11" is transmitted, and if it is assumed that the previously transmitted sub packet has the code symbol size obtained in the present sub packet, the fourth sub packet is transmitted from the 3072nd (i.e., 21504*3−15360*4) position among the code symbols of the encoded packet.

According to the above-described process, the receiving end, as shown in FIG. 8B, regenerates the encoded packets using the received sub packets, and decodes the regenerated encoded packets.

Figure 9A:
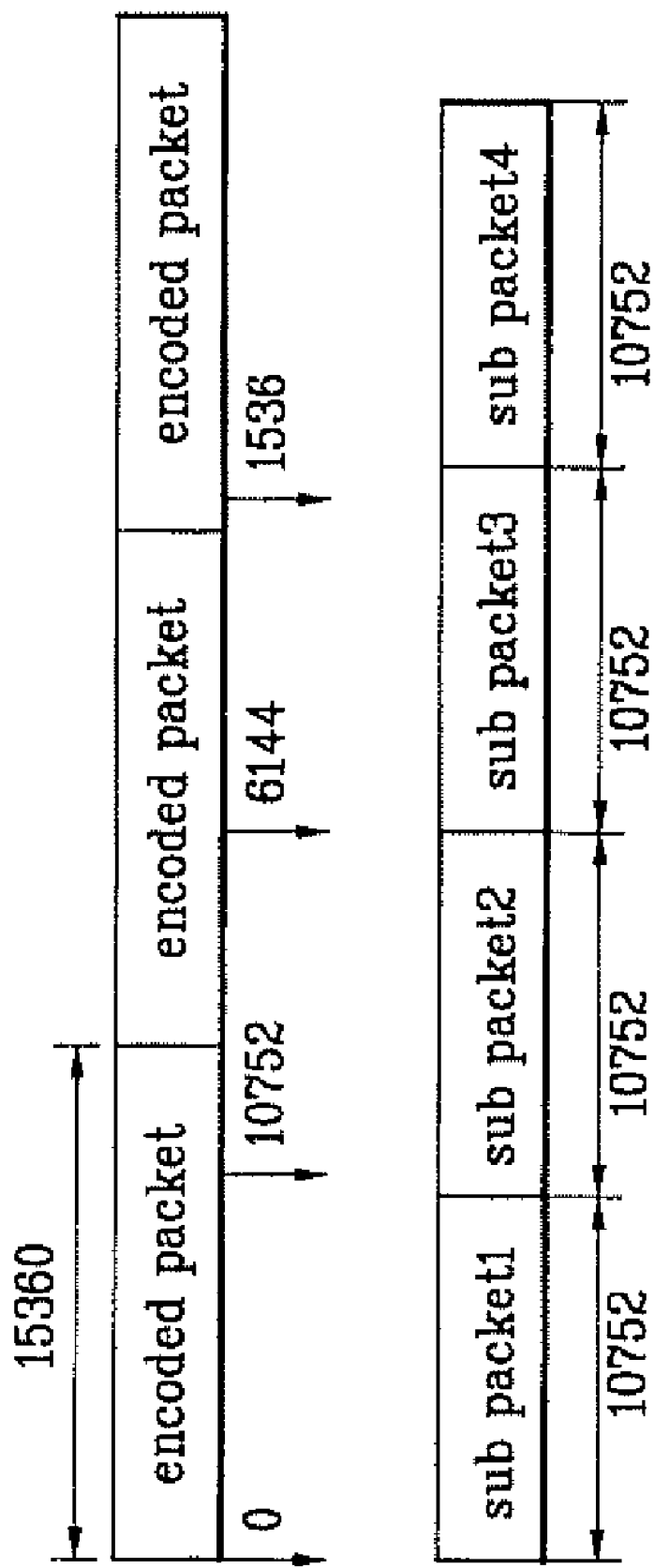
FIGS. 9A and 9B are views illustrating another example of an AIR type transmitting and restoring method according to the present invention.
Figure 9B:
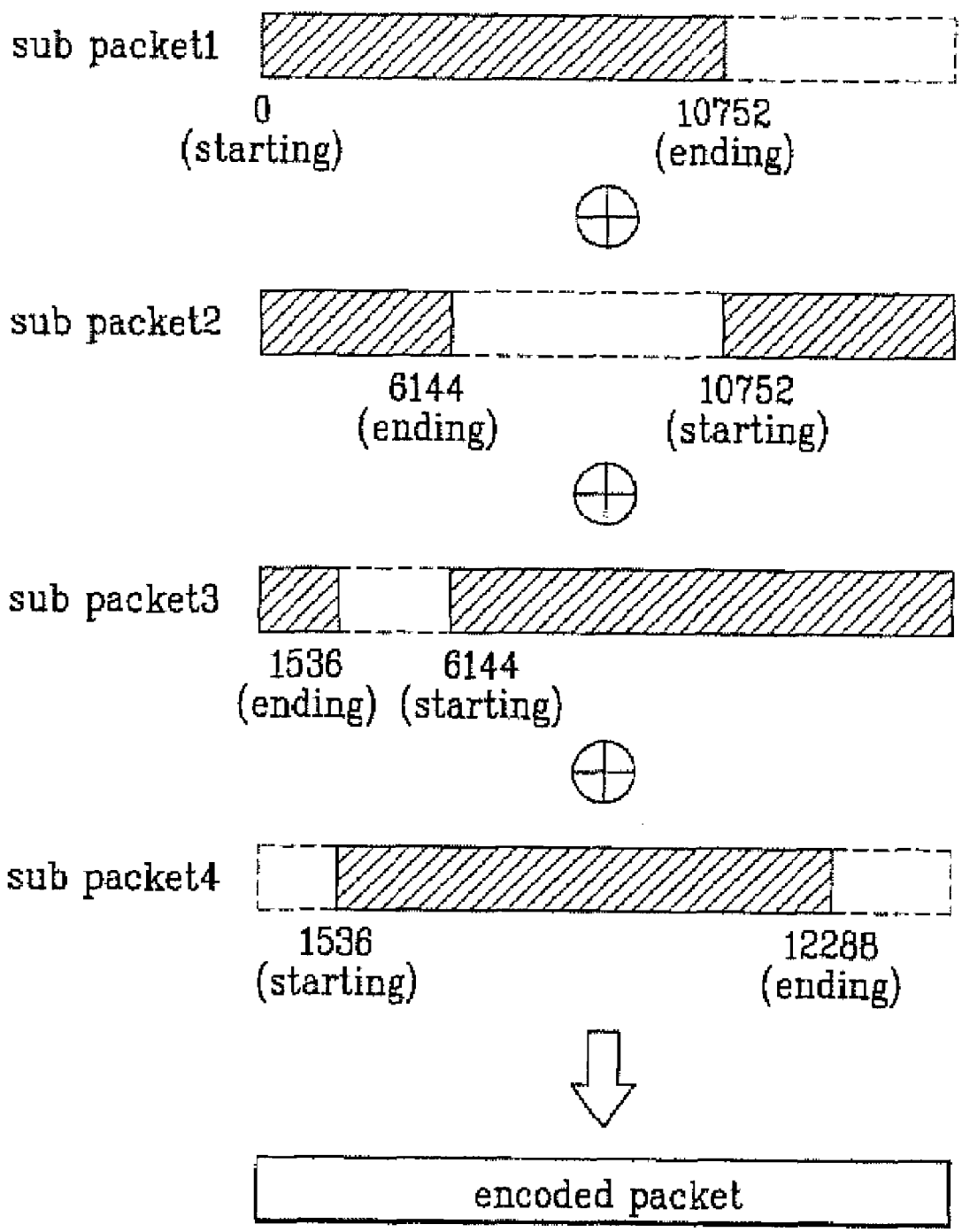

FIGS. 9A and 9B are views illustrating another example of an AIR type transmitting and restoring method according to the present invention.

In FIG. 9A, the length of the encoder packet is 3072 bits, and the number of useable Walsh codes is 28. The length of all the sub packets is 4 since a modulation and coding scheme level is not changed.

Accordingly, a plurality of encoder packets, which include 15360 bits, are generated as shown in FIGS. 4A and 4B, and the transmission time points of the respective sub packets in the encoded packets are determined as follows. At this time, the size of the code symbols of the respective sub packets is 10752.

That is, the first sub packet "00" is transmitted from the first of the encoded packet.

The receiving end successfully performs the decoding of one sub packet, and transmits an ACK to the transmitting end. Then, the transmitting end does not transmit any more sub packets.

However, if the receiving end fails to decode, it transmits a NACK to the transmitting end. Then, the transmitting end transmits the sub packet having the next SPID.

Accordingly, the code symbol size of the second sub packet is 10752 at a time point when the second sub packet "01" is transmitted, and thus the second sub packet is transmitted from the 10752nd (i.e., 10752*1–15360*0) position among the code symbols of the encoded packet.

In the same manner, the code symbol size of the third sub packet is 10752 at a time point when the third sub packet "10" is transmitted, and thus the third sub packet is transmitted from the 6144th (i.e., 10752*2–15360*1) position among the code symbols of the encoded packet.

The code symbol size of the fourth sub packet is 10752 at a time point when the fourth sub packet "11" is transmitted, and thus the fourth sub packet is transmitted from the 1536th (i.e., 10752*3–15360*2) position among the code symbols of the encoded packet.

According to the above-described process, the receiving end, as shown in FIG. 9B, regenerates the encoded packets using the received sub packets, and decodes the regenerated encoded packets.

That is, the receiving end, that received the sub packets, concatenates or combines at least one sub packet previously transmitted with the received sub packet according to the number of code symbols of the received sub packet.

As shown in FIG. 9B, it can be confirmed that another example according to the present invention performs the encoded packet transmission in the same manner as the sequential transmitting method.

As described above, the present invention provides the following effects.

First, in case that the sub packets have a variable length, the receiving end can regenerate the sub packets into one packet and perform the decoding even though any sub packet is missing.

Second, in case of transmitting the sub packets having a variable length, the receiving end can perform the decoding of the encoded packet through the next sub packet even though it cannot receive the control channel, and thus the power consumption occurring due to the control channel can be reduced.

Third, the start points of the sub packets are positioned at unequal intervals, and thus the loss of the coding gain occurring at the start points of equal intervals can be minimized.

Fourth, the receiving end can judge whether the transmitted sub packet is the initially transmitted sub packet of the packet, and thus the receiving end can perform a proper operation.

Fifth, since the fixed-position transmitting method is used, the receiving end can successfully combine the received sub packets even if the sub packet is lost during performing the sequential transmitting method, and improve the reliability of ACK/NACK.

Sixth, since the size of the code symbol is not changed in case that the MSC level per sub packet is not changed, the transmission is performed in the same manner as the sequential transmitting method, and a sufficient coding gain according to the HARQ method can be obtained, being different from the fixed-position transmitting method.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of transmitting a plurality of sub packets in a communication device using hybrid automatic repeat request, the method comprising:
    forming an encoded data packet generated by encoding information to be transmitted;
    generating a first sub packet having a first sub packet identifier from the encoded data packet, wherein the first sub packet is generated from an initial start point within the encoded data packet;
    transmitting the first sub packet before any other sub packets having a sub packet identifier other than the first sub packet identifier;
    generating at least one sub packet from the encoded data packet; and
    transmitting the at least one sub packet,
    wherein each of the at least one sub packet has a specific length and a specific sub packet identifier selected from among the first sub packet identifier, a second sub packet identifier, a third sub packet identifier and a fourth sub packet identifier in any order, and
    wherein each of the at least one sub packet is generated from a specific start point determined based on a value resulting from multiplying the specific sub packet identifier and the specific length within the encoded data packet.

2. The method claim 1, wherein the first sub packet identifier, second sub packet identifier, third sub packet identifier and fourth sub packet identifier have binary values, respectively, of "00," "01", "10" and "11".

3. The method of claim 1, wherein lengths of every sub packet that is part of the same encoded data packet are the same.

4. The method of claim 1, wherein lengths of every sub packet that is part of the same encoded data packet are variable.

5. The method of claim 1, wherein each of the at least one sub packet is transmitted through a prescribed number of slots of a packet data channel.

* * * * *